United States Patent [19]
Kane, Jr.

[11] Patent Number: 6,079,983
[45] Date of Patent: Jun. 27, 2000

[54] EDUCATIONAL INSTRUMENT FOR NUMBERS

[76] Inventor: James T. Kane, Jr., 94 Adams St. #108, Waltham, Mass. 02453

[21] Appl. No.: 09/453,617

[22] Filed: Dec. 3, 1999

[51] Int. Cl.[7] .............................. G09B 1/00; G09B 19/00
[52] U.S. Cl. ......................... 434/209; 434/188; 434/191; 434/202; 434/199; 273/157 R; 40/488; 40/491
[58] Field of Search ................................. 434/188, 201, 434/207, 209, 210, 202, 199; 40/488, 489, 490, 491; 273/157 R

[56] References Cited

U.S. PATENT DOCUMENTS

| | | |
|---|---|---|
| 1,155,523 | 11/1915 | Smith . |
| 1,527,663 | 2/1925 | Berry . |
| 1,720,812 | 7/1929 | Zim . |
| 2,656,618 | 10/1953 | Pescatori . |
| 3,009,262 | 11/1961 | Moran . |
| 3,735,504 | 5/1973 | Fedyna ................................ 434/209 |
| 4,445,865 | 5/1984 | Sellon ................................ 434/207 |

Primary Examiner—Robert A. Hafer
Assistant Examiner—Bena B. Miller

[57] ABSTRACT

An educational instrument for numbers for providing students with an educational tool that would be fun and challenging. The educational instrument for numbers includes a base member having a top side, a recessed portion in the top side, a first longitudinal slot, a second longitudinal slot, a first longitudinal groove extending from the recessed portion and terminating near a first end of the base member, a second longitudinal groove extending from the recessed portion and terminating near a second end of the base member, a matrix of numbers disposed in the recessed portion, a first cover means slidably disposed in the first longitudinal slot and movable over the recessed portion, and a second cover means slidably disposed in the second longitudinal slot and movable over the recessed portion and over the first cover member.

11 Claims, 2 Drawing Sheets

EDUCATIONAL INSTRUMENT FOR NUMBERS

BACKGROUND OF THE INVENTION

1. Field of the Invention

The present invention relates to a multiplication of numbers tool and more particularly pertains to a new educational instrument for numbers for providing students with an educational tool that would be fun and challenging.

2. Description of the Prior Art

The use of a multiplication of numbers tool is known in the prior art. More specifically, a multiplication of numbers tool heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 1,163,125; U.S. Pat. No. 2,656,618; U.S. Pat. No. 4,445,865; U.S. Pat. No. 3,735,504; U.S. Pat. No. 2,502,238; and U.S. Pat. No. 898,587.

While these devices fulfill their respective, particular objectives and requirements, the aforementioned patents do not disclose a new educational instrument for numbers. The inventive device includes a base member having a top side, a recessed portion in the top side, a first longitudinal slot, a second longitudinal slot, a first longitudinal groove extending from the recessed portion and terminating near a first end of the base member, a second longitudinal groove extending from the recessed portion and terminating near a second end of the base member, a matrix of numbers disposed in the recessed portion, a first cover means slidably disposed in the first longitudinal slot and movable over the recessed portion, and a second cover means slidably disposed in the second longitudinal slot and movable over the recessed portion and over the first cover member.

In these respects, the educational instrument for numbers according to the present invention substantially departs from the conventional concepts and designs of the prior art, and in so doing provides an apparatus primarily developed for the purpose of providing students with an educational tool that would be fun and challenging.

SUMMARY OF THE INVENTION

In view of the foregoing disadvantages inherent in the known types of a multiplication of numbers tool now present in the prior art, the present invention provides a new educational instrument for numbers construction wherein the same can be utilized for providing students with an educational tool that would be fun and challenging.

The general purpose of the present invention, which will be described subsequently in greater detail, is to provide a new educational instrument for numbers which has many of the advantages of the a multiplication of numbers tool mentioned heretofore and many novel features that result in a new educational instrument for numbers which is not anticipated, rendered obvious, suggested, or even implied by any of the prior art a multiplication of numbers tool, either alone or in any combination thereof.

To attain this, the present invention generally comprises a base member having a top side, a recessed portion in the top side, a first longitudinal slot, a second longitudinal slot, a first longitudinal groove extending from the recessed portion and terminating near a first end of the base member, a second longitudinal groove extending from the recessed portion and terminating near a second end of the base member, a matrix of numbers disposed in the recessed portion, a first cover means slidably disposed in the first longitudinal slot and movable over the recessed portion, and a second cover means slidably disposed in the second longitudinal slot and movable over the recessed portion and over the first cover member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new educational instrument for numbers which has many of the advantages of the a multiplication of numbers tool mentioned heretofore and many novel features that result in a new educational instrument for numbers which is not anticipated, rendered obvious, suggested, or even implied by any of the prior art a multiplication of numbers tool, either alone or in any combination thereof.

It is another object of the present invention to provide a new educational instrument for numbers which may be easily and efficiently manufactured and marketed.

It is a further object of the present invention to provide a new educational instrument for numbers which is of a durable and reliable construction.

An even further object of the present invention is to provide a new educational instrument for numbers which is susceptible of a low cost of manufacture with regard to both materials and labor, and which accordingly is then susceptible of low prices of sale to the consuming public, thereby making such an educational instrument for numbers economically available to the buying public.

Still yet another object of the present invention is to provide a new educational instrument for numbers which provides in the apparatuses and methods of the prior art some of the advantages thereof, while simultaneously overcoming some of the disadvantages normally associated therewith.

Still another object of the present invention is to provide a new educational instrument for numbers for providing students with an educational tool that would be fun and challenging.

Yet another object of the present invention is to provide a new educational instrument for numbers which includes a base member having a top side, a recessed portion in the top side, a first longitudinal slot, a second longitudinal slot, a first longitudinal groove extending from the recessed portion and terminating near a first end of the base member, a second longitudinal groove extending from the recessed portion and terminating near a second end of the base member, a matrix of numbers disposed in the recessed portion, a first cover means slidably disposed in the first longitudinal slot and movable over the recessed portion, and a second cover means slidably disposed in the second longitudinal slot and movable over the recessed portion and over the first cover member.

Still yet another object of the present invention is to provide a new educational instrument for numbers that provides hours of fun for the user while learning one's numbers.

Even still another object of the present invention is to provide a new educational instrument for numbers that is much more effective than a simple oral question and answer process.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
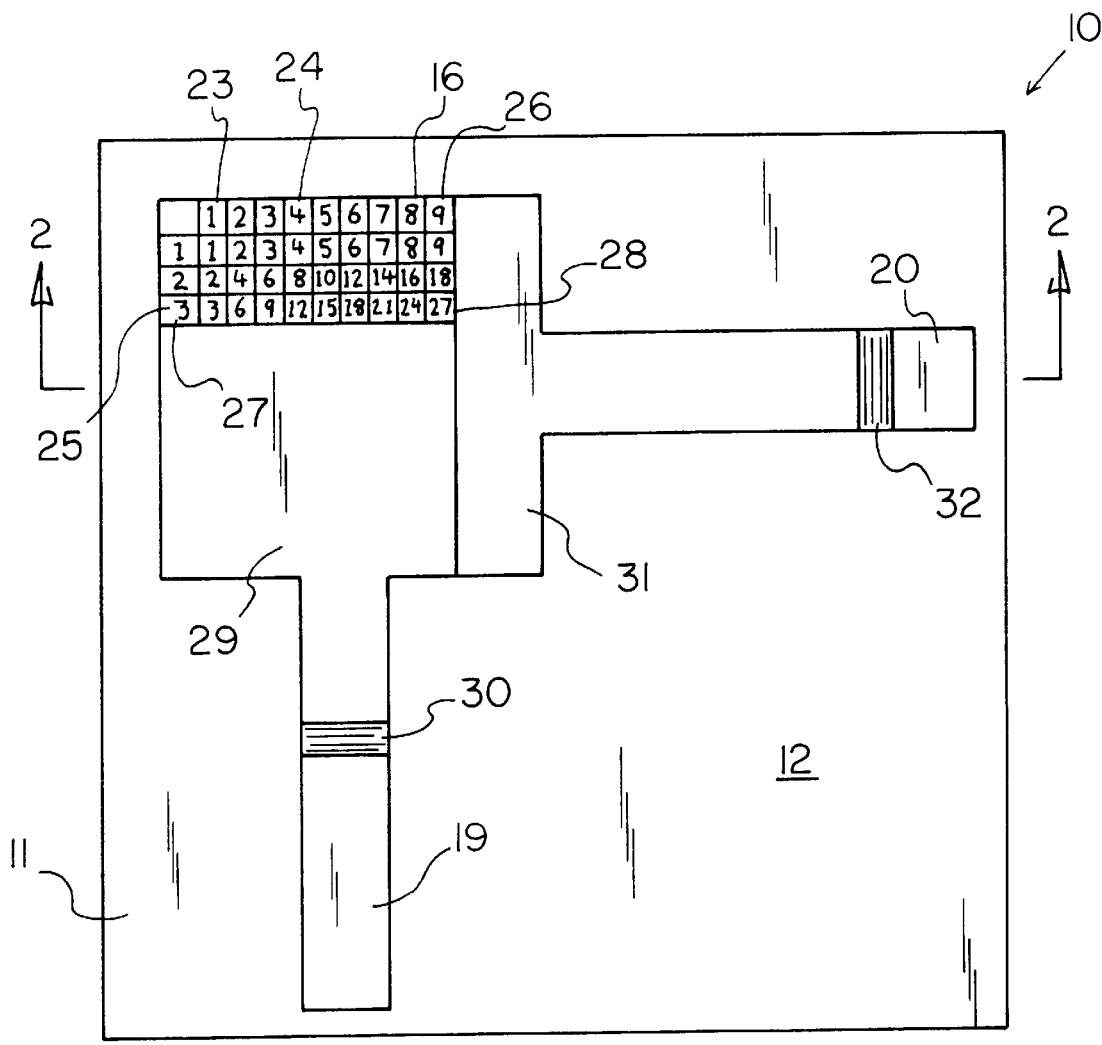
FIG. 1 is a top planar view of a new educational instrument for numbers in use according to the present invention.
Figure 2:
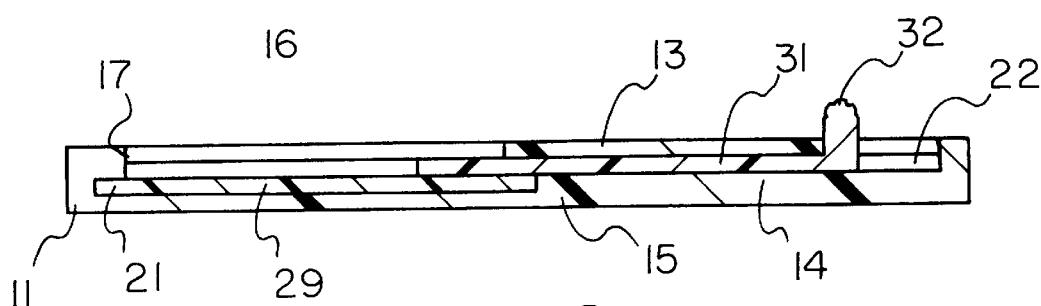
FIG. 2 is a first side elevational view of the present invention.
Figure 3:
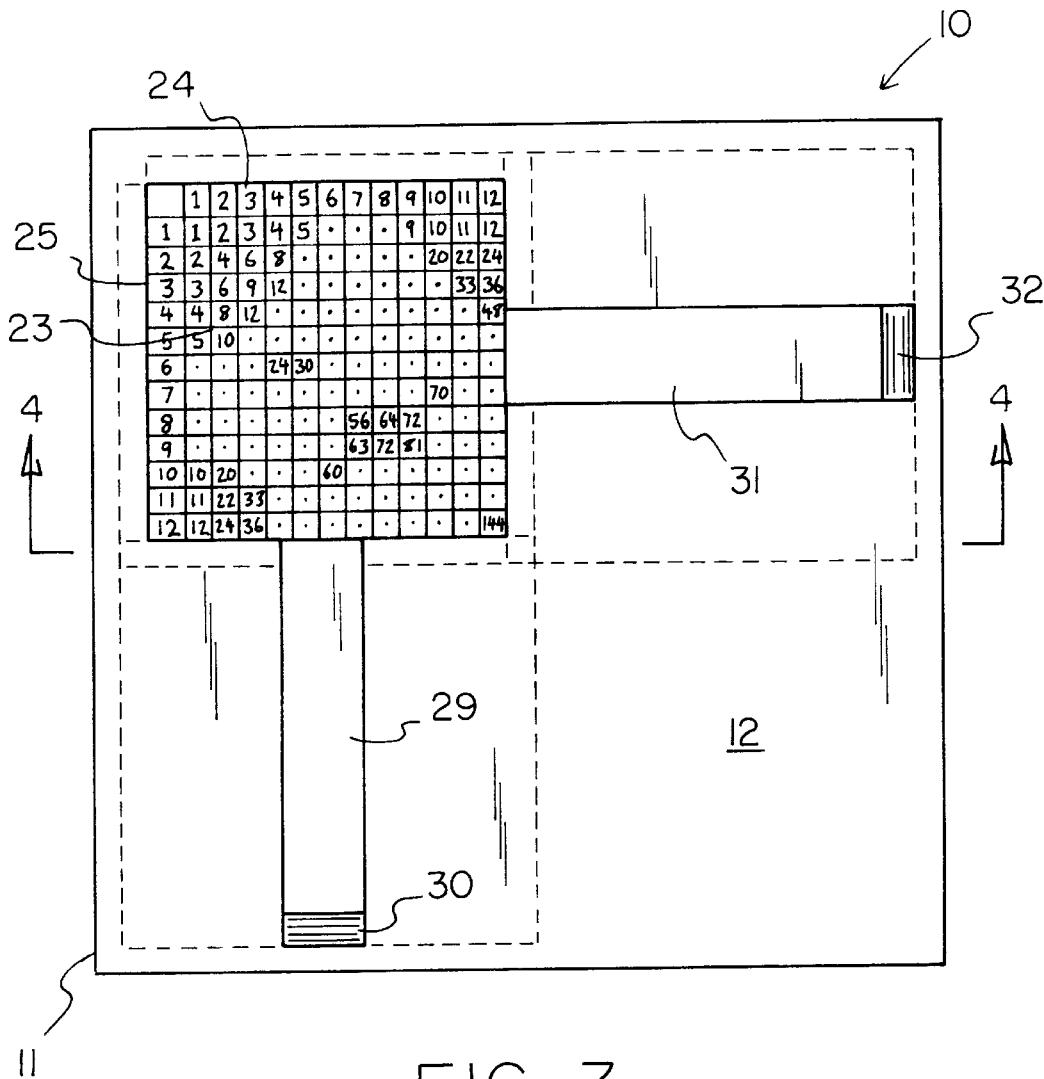
FIG. 3 is a top planar view of the present invention.
Figure 4:
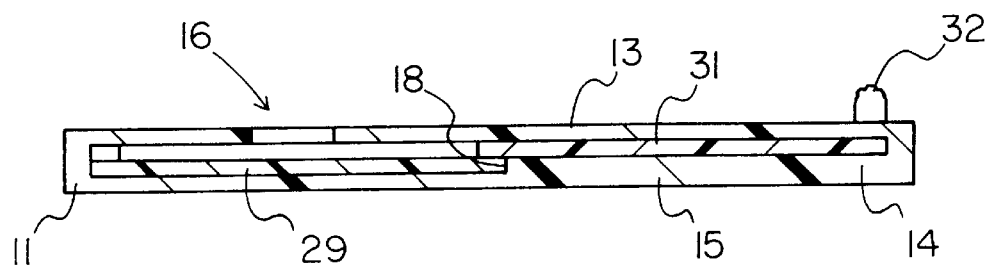
FIG. 4 is a second side elevational view of the present invention.

With reference now to the drawings, and in particular to FIGS. 1 through 4 thereof, a new educational instrument for numbers embodying the principles and concepts of the present invention and generally designated by the reference numeral 10 will be described.

As best illustrated in FIGS. 1 through 4, an educational instrument for numbers 10 generally comprises a base member 11 having a top side 12, a recessed portion 16 near a corner of the base member 11, a plurality of numbers arranged in a matrix 23 and being disposed and exposed in the recessed portion 16, and further having an upper level 13, a middle level 14, and a lower level 15. A first longitudinal slot 21 is disposed between a portion of the middle level 14 and a portion of the lower level 15 and is adjacent to a first side 17 of the recessed portion 16. A second longitudinal slot 22 is disposed between a portion of the upper level 13 and a portion of the middle level 14 and is adjacent to a second side 18 of the recessed portion 16. A first longitudinal groove 19 extends through a portion of the top side 12 and extends from the recessed portion 16 and terminates near a first end of the base member 11. A second longitudinal groove 20 extends through a portion of the top side 12 and extends from the recessed portion 16 and terminates near a second end of the base member 11. The base member 11 is essentially planar. The first longitudinal slot 21 extends parallel of the top side 12 of the base member 11 and has a width generally equal to that of the recessed portion 16 and extends through a first side wall 17 defining the recessed portion 16. The second longitudinal slot 22 extends parallel of the top side 12 of the base member 11 and has a width generally equal to that of the recessed portion 16 and extends through a second side wall 18 defining the recessed portion 16. The first longitudinal groove 19 essentially bisects the first longitudinal slot 21, and the second longitudinal groove 20 essentially bisects the second longitudinal slot 22. A first cover means includes a first planar member 29 which is movably disposed in the first longitudinal slot 21 and further has a first handle member 30 securely attached to the first planar member 29 and being movably disposed in the first longitudinal groove 19 for moving the first planar member 29. The first planar member 29 is movable over the recessed portion 16 and is dimensioned to cover essentially all of the recessed portion 16 including the matrix 23. A second cover means includes a second planar member 31 which is movably disposed in the second longitudinal slot 22 and further has a second handle member 32 securely attached to the second planar member 31 and is movably disposed in the second longitudinal groove 20 for moving the second planar member 31. The second planar member 31 is movable over the recessed portion 16 and is dimensioned to cover essentially all of the recessed portion 16, wherein when the first and second planar members 29,31 are moved over the recessed portion 16, the second planar member 31 is disposed above the first planar member 29. The matrix 23 includes rows 24 and columns 25 of numbers and further includes a left side column 25 of numbers and a top row 24 of numbers and also includes a number 28 located at an intersection of a first number 26 in the top row 24 and a second number 27 in the left side column 25 with the intersection being a number 28 equal to a multiplication of the first number 26 with the second number 27 and being exposed immediately forward and above where the first and second planar members 29,31 intersect.

In use, the user can easily and conveniently learn the multiplication tables by sliding the first and second planar members 29,31 over the matrix 23 in the recessed portion 16 and by taking the number 26 in the top row 24 immediately to the left of the second planar member 31 and by taking the number 27 in the left column 25 immediately above the first planar member 29 with the multiplication of those two numbers being located at the intersection of those two numbers which is immediately forward and above where the first and second planar members 29,31 intersect. By sliding the first and second planar members 29,31 anywhere over the matrix 23, the user can learn the multiplication table.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An educational instrument comprising:
   a base member having a top side, a recessed portion near a corner of said base member, a plurality of numbers arranged in a matrix and being disposed and exposed in said recessed portion, an upper level, a middle level, a lower level, a first longitudinal slot disposed between a portion of said middle level and a portion of said lower level, a second longitudinal slot disposed between a portion of said upper level and a portion of said middle level, a first longitudinal groove extending through a portion of said top side and extending from said recessed portion and terminating near a first end of said base member, and a second longitudinal groove extending through a portion of said top side and extending from said recessed portion and terminating near a second end of said base member;
   a first cover means having a first planar member which is movably disposed in said first longitudinal slot and further having a first handle member securely attached to said first planar member and being movably disposed in said first longitudinal groove for moving said first planar member; and
   a second cover means having a second planar member which is movably disposed in said second longitudinal slot and further having a second handle member securely attached to said second planar member and being movably disposed in said second longitudinal groove for moving said second planar member.

2. An educational instrument for numbers as described in claim 1, wherein said base member is essentially planar.

3. An educational instrument for numbers as described in claim 2, wherein said first longitudinal slot extends parallel of said top side of said base member and has a width generally equal to that of said recessed portion and extends through a first side wall defining said recessed portion.

4. An educational instrument for numbers as described in claim 3, wherein said second longitudinal slot extends parallel of said top side of said base member and has a width generally equal to that of said recessed portion and extends through a second side wall defining said recessed portion.

5. An educational instrument for numbers as described in claim 4, wherein said first planar member is movable over said recessed portion and is dimensioned to cover essentially all of said recessed portion.

6. An educational instrument for numbers as described in claim 5, wherein said second planar member is movable over said recessed portion and is dimensioned to cover essentially all of said recessed portion.

7. An educational instrument for numbers as described in claim 6, wherein when said first and second planar members are moved over said recessed portion, said second planar member is disposed above said first planar member.

8. An educational instrument for numbers as described in claim 7, wherein said first longitudinal groove essentially bisects said first longitudinal slot.

9. An educational instrument for numbers as described in claim 8, wherein said second longitudinal groove essentially bisects said second longitudinal slot.

10. An educational instrument for numbers as described in claim 9, wherein said matrix includes rows and columns of numbers and further includes a left side column of numbers and a top row of numbers and also includes a number located at an intersection of a first number in said top row and a second number in said left side column, said intersection being a number equal to a multiplication said first number with said second number.

11. An educational instrument for numbers comprising:
    a base member having a top side, a recessed portion near a corner of said base member, a plurality of numbers arranged in a matrix and being disposed and exposed in said recessed portion, an upper level, a middle level, a lower level, a first longitudinal slot disposed between a portion of said middle level and a portion of said lower level, a second longitudinal slot disposed between a portion of said upper level and a portion of said middle level, a first longitudinal groove extending through a portion of said top side and extending from said recessed portion and terminating near a first end of said base member, and a second longitudinal groove extending through a portion of said top side and extending from said recessed portion and terminating near a second end of said base member, said base member being essentially planar, said first longitudinal slot extending parallel of said top side of said base member and having a width generally equal to that of said recessed portion and extending through a first side wall defining said recessed portion, said second longitudinal slot extending parallel of said top side of said base member and having a width generally equal to that of said recessed portion and extending through a second side wall defining said recessed portion, said first longitudinal groove essentially bisecting said first longitudinal slot, said second longitudinal groove essentially bisecting said second longitudinal slot;
    a first cover means having a first planar member which is movably disposed in said first longitudinal slot and further having a first handle member securely attached to said first planar member and being movably disposed in said first longitudinal groove for moving said first planar member, said first planar member being movable over said recessed portion and being dimensioned to cover essentially all of said recessed portion including said matrix; and
    a second cover means having a second planar member which is movably disposed in said second longitudinal slot and further having a second handle member securely attached to said second planar member and being movably disposed in said second longitudinal groove for moving said second planar member, said second planar member being movable over said recessed portion and being dimensioned to cover essentially all of said recessed portion, wherein when said first and second planar members are moved over said recessed portion, said second planar member is disposed above said first planar member, said matrix including rows and columns of numbers and further including a left side column of numbers and a top row of numbers and also including a number located at an intersection of a first number in said top row and a second number in said left side column, said intersection being a number equal to a multiplication of said first number with said second number and being exposed immediately forward and above where said first and second planar members intersect.

\* \* \* \* \*